Figure 5:
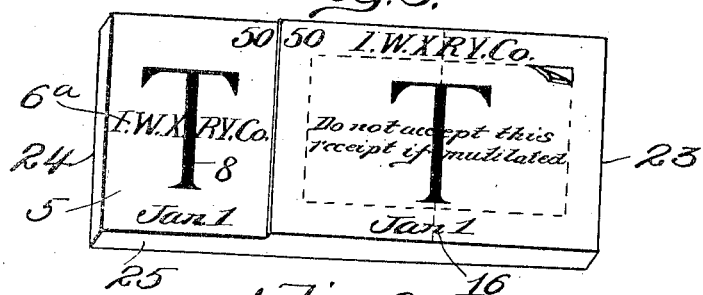

No. 876,294.
PATENTED JAN. 7, 1908.
H. N. BROWN & J. B. N. CARDOZA.
RAILWAY FARE RECEIPT TICKET.
APPLICATION FILED SEPT. 24, 1907.
2 SHEETS—SHEET 1.
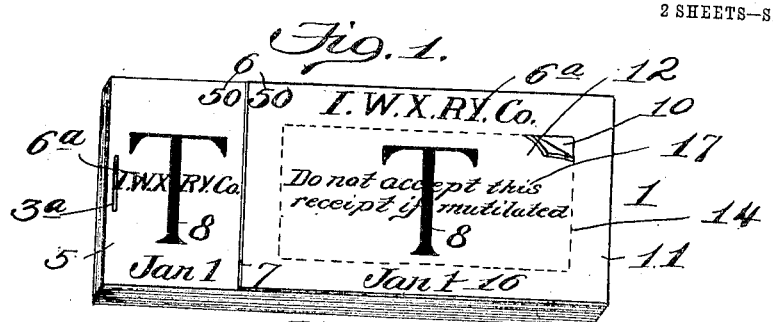
Fig. 1.
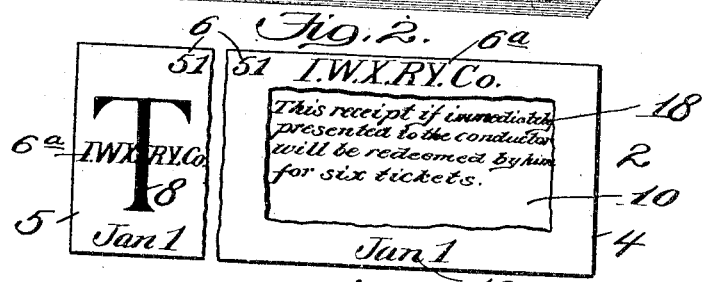
Fig. 2.
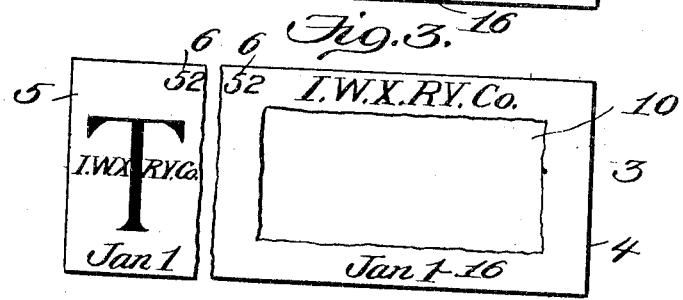
Fig. 3.
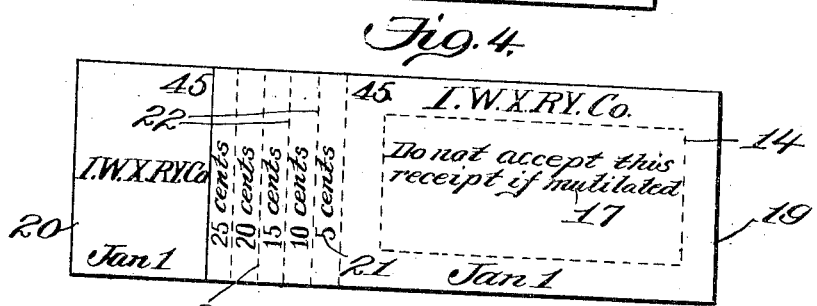
Fig. 4.
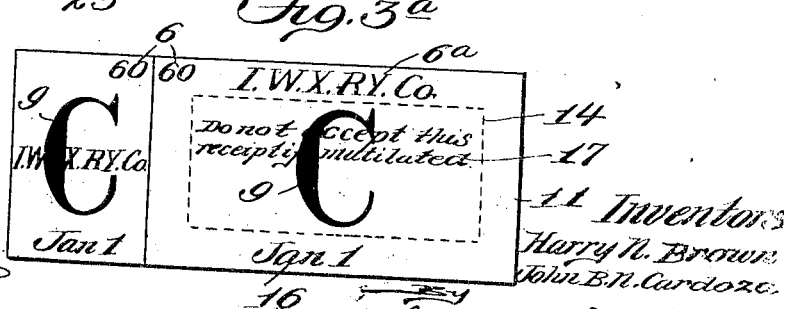
Fig. 3ª.
Witnesses:
Inventors
Harry N. Brown
John B. N. Cardoza
By James L. Norris
Atty.

No. 876,294.

PATENTED JAN. 7, 1908.

H. N. BROWN & J. B. N. CARDOZA.
RAILWAY FARE RECEIPT TICKET.
APPLICATION FILED SEPT. 24, 1907.

2 SHEETS—SHEET 2.

Witnesses:

Inventors
Harry N. Brown
John B. N. Cardoza
By
James L. Norris
Atty

UNITED STATES PATENT OFFICE.

HARRY N. BROWN, OF PHILADELPHIA, PENNSYLVANIA, AND JOHN B. N. CARDOZA, OF NORFOLK, VIRGINIA, ASSIGNORS OF ONE-FOURTH TO EDWIN C. HATHAWAY AND ONE-FOURTH TO WILLIAM R. ALLEN, OF NORFOLK, VIRGINIA.

RAILWAY-FARE RECEIPT-TICKET.

No. 876,294.  Specification of Letters Patent.  Patented Jan. 7, 1908.

Application filed September 24, 1907. Serial No. 394,344.

*To all whom it may concern:*

Be it known that we, HARRY N. BROWN, citizen of the United States, and resident of Philadelphia, county of Philadelphia, State of Pennsylvania, and JOHN B. N. CARDOZA, a citizen of the United States, residing at Norfolk, in the county of Norfolk and State of Virginia, have invented new and useful Improvements in Railway-Fare Receipt-Tickets, of which the following is a specification.

This invention relates to railway fare receipt tickets, for use in connection with city, suburban and interurban traction lines; and the object thereof is to provide, in a manner as hereinafter set forth, a pad or block of receipt tickets each comprising a passenger's receiving portion and a conductor's retaining portion, the passenger's receiving portion indicating the amount of fare paid and the conductor's retaining portion indicating the amount of fare received, the amount of fare indicated by the passenger's receiving portion being the same as that indicated by the conductor's retaining portion. Furthermore, the conductor's retaining portion constitutes an auditor's stub for maintaining a check upon the number of fares received by the conductor so that he will not be able to defraud the company of a portion of the fares received daily or during a trip.

A further object of the invention is to provide the passenger's receiving portion of certain of the receipt tickets of the pad or block with means to indicate to the passenger that the receipt handed him by the conductor is of value and is redeemable by the conductor or the company issuing it, consequently offering an incentive for the passenger to insist upon the conductor issuing a receipt for the fare tendered, and furthermore inducing the passenger to accept the receipt.

With the foregoing and other objects in view, the invention consists of the novel construction of railway fare receipt ticket as set forth in the accompanying drawings, wherein is shown the preferred embodiment of the invention, but it is to be understood that changes, variations and modifications can be resorted to which come within the scope of the claims hereunto appended.

Figure 6:
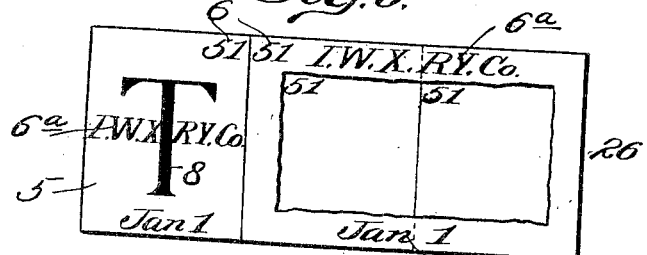
Figure 7:
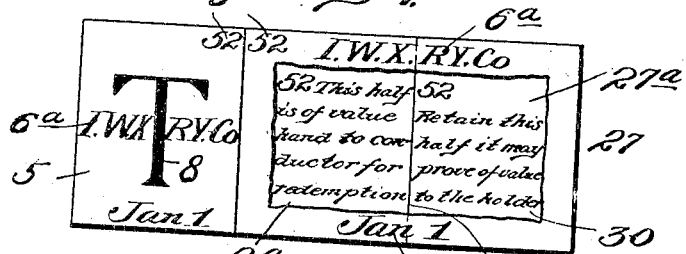
Figure 8:
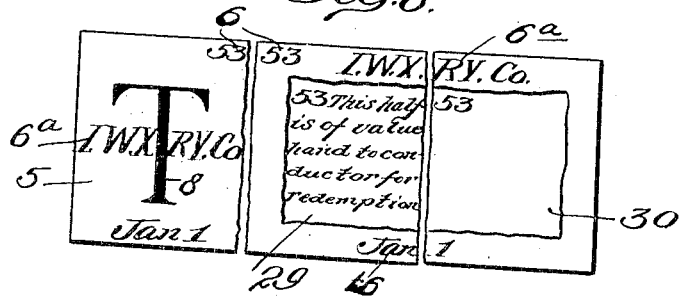

In the drawings—Figure 1 is a perspective view of a pad or block of railway fare receipt tickets in accordance with this invention; Fig. 2 is a face view of one of the fare receipt tickets of the block with the passenger's receiving portion detached from the conductor's retaining portion, and also showing a mutilation of the passenger's receiving portion, said portion having means to indicate that the receipt is of value; Fig. 3 is a view similar to Fig. 2 without the passenger's receiving portion being provided with an indication to constitute it of value; Fig. 3$^a$ is a view showing the form of ticket illustrated in Figs. 2 and 3, with a conventional means to indicate that the fare received is in the form of cash; Fig. 4 is a face view of a modified form of ticket used upon suburban or interurban lines; Fig. 5 is a perspective view of a pad or block of railway receipt tickets in accordance with this invention embodying a modified means for connecting the ticket together to form the pad or block; Fig. 6 is a face view of a modified form of ticket; Fig. 7 is a like view with a part of one of the sections of the body portion removed; Fig. 8 is a like view of the ticket shown in Fig. 7 with the body portion separated from the stub and the body portion torn in half.

Referring to the drawings by reference characters, 1 denotes a pad or block of railway fare receipt tickets in accordance with this invention, and which are consecutively numbered. Certain of the tickets of the pad or block are of the form shown in Fig. 2 and indicated by the reference character 2, and the remaining tickets of the pad or block are of the form as shown in Fig. 3 and indicated by the reference character 3. The tickets are connected together by the staple 3$^a$ to form the pad or block.

Referring to Figs. 1, 2 and 3 of the drawings each of the tickets 2 and 3 comprises a passenger's receiving portion 4 and a conductor's retaining portion or stub 5. The portions 4 and 5 are correspondingly numbered as at 6, as well as being provided with a corresponding inscription to indicate the name of the railway issuing the receipt as at 6$^a$. The portion 4 is separated from the portion 5 by a weakened line 7, so that the said portion 4 can be readily detached from the portion 5 when occasion so requires. The portions 4 and 5 are provided with a suitable corresponding conventional means, as at 8, to indicate what is received from the passenger for transportation. As shown, by way of example, such conventional means is the letter "T," somewhat enlarged, and this conventional means indicates that the conductor has received a ticket from the passenger for transportation. If a cash fare is tendered in lieu of a ticket, the receipt issued by the conductor will contain the letter "C," somewhat enlarged, as shown in Fig. 3ª, as at 9. This will indicate that a cash fare has been paid for transportation.

The forms of railway fare ticket shown in Figs. 2, 3 and 3ª are adapted for use upon railway lines having a single rate of fare. The form of railway fare receipt ticket in accordance with this invention for use upon traction lines where the fare varies is illustrated in Fig. 4 and will be hereinafter referred to.

The passenger's receiving portion 4 is formed of two sections 10 and 11, the former being integral with the conductor's receiving portion 4 and is detached therefrom when occasion so requires, while the section 11 is secured upon the section 10 by a suitable adhesive. The inner face of the section 11 has the adhesive material so disposed thereon that the adhesive material will extend entirely around the margin of the inner face of said section, thereby securing only a part of the inner face of the section 11 to the section 10. The adhesive material is so disposed that the section 11 is provided with a rectangular unattached portion 12. The section 11 may be provided with lines as at 14 to indicate the boundary of the unattached rectangular portion 12 to assist when occasion requires a passenger tearing from the section 11 the unattached portions 12 so that a part of the outer face of the section 10 will be visible. The section 11 is furthermore provided with a conventional means, as at 16, to indicate the day of the month and the unattached portion 12 of said section 1 has printed on its outer face an inscription to constitute a warning as at 17, such inscription being to the effect that the passenger should not accept the receipt if the same is mutilated or if the unattached portions are torn or removed from the section 11.

In Fig. 2 the section 10 of the ticket 2 is shown provided with an inscription as at 18 to indicate that the passenger's receiving portion 4 is of value. As illustrated, said means reads: "This receipt if immediately presented to the conductor will be redeemed by him for six tickets." The inscription 18 normally is concealed until the unattached portion 12 is removed. In Fig. 3 the section 10 of the ticket 3 is not provided with an inscription which would indicate that the passenger's receiving portion 4 is of value.

By way of example the inscription 18 upon the section 10 indicates that the passenger will receive six tickets if presented to the conductor. Now if the form of ticket shown in Fig. 3ª is used, the inscription 18 will be such as to indicate that the receiving portion 4 would be redeemed for transportation, the transportation being specified by the inscription. It is thought unnecessary to show this, as a change in the inscription would be obvious.

In Fig. 4 the ticket is indicated by the reference character 19 and the form of ticket illustrated is adapted for use upon railway lines bearing rates of fare. The conductor's retaining portion 20 is somewhat elongated and is provided with a cash fare indicating part 21 and is divided into any suitable number of spaces by perforated or indented lines 22 which extend transversely across the conductor's retaining portion 20. The first of these spaces to the right has printed thereon "Five cents", the next "Ten cents", and so on for as many spaces as may be required for the road upon which the ticket is used. If a passenger tenders his fare, say for example fifteen cents, the ticket is severed at the line 23 and the amount of fare which has been paid will be indicated upon the passenger's receipt portion. The cash fare indicating part is of known construction and it is thought unnecessary to further describe the same. The passenger's receipt portion shown in Fig. 4 is similar to that shown in Figs. 2, 3 and 3ª, but with the letters "T" or "C" omitted. Similar reference character are applied to the parts of the ticket shown in Fig. 4 which correspond to the parts shown in Figs. 2, 3 and 3ª. The form of ticket shown in Fig. 4 constitutes one of a pad or block and the passenger's receiving portion of certain of the tickets will be provided with means to indicate to the passenger that the receipt handed him by the conductor is of value and is redeemable by the conductor or the company issuing it.

The pad or block of tickets shown in Fig. 5 and indicated by the reference character 23 is formed by gluing one horizontal edge and one longitudinal edge of the ticket together, as at 24, 25 in lieu of employing the rivet 3ª. Certain of the tickets of the pad or block 23 are of the form shown in Fig. 6 and indicated by the reference character 26 and the remaining tickets of the pad or block are of the form shown in Figs. 7 and 8 and indicated by the reference character 27. The tickets shown in Figs. 5, 6, 7 and 8 are similar to the form of tickets shown in Figs. 1, 2, 3 and 3ª, with this exception, that the section 27ª of the passenger's receiving portion 4 is divided by a line 28 into two divisions 29 and 30 which are each provided with a number corresponding to the number of the ticket. The section 27ª corresponds to the section 10 of Figs. 1, 2, 3 and 3ª. One of the divisions of the section 27ª may be provided with an inscription to constitute the receipt of value or both of the divisions of the section 27ª may each be provided with an inscription to constitute the receipt of double value or one of the divisions of the section 27ª may be provided with an inscription to constitute said division of value if handed to the conductor and the other division may be provided with an inscription to the effect that the said division may be of value at the end of a month or a predetermined time, the company who issues the receipts offering a prize to the party or parties holding certain of the divisions of the sections 27ª which contain the inscription to the effect that such division may be of value. This is an incentive for the passenger to retain such division of the section 27ª until he ascertains that the division is or is not of value. The divisions 29 and 30 of the section 27ª may not be provided with any inscriptions whatsoever to constitute them of value.

Although the body portion of certain of the tickets is provided with one or more inscriptions to indicate that the said portions are of value and redeemable by the conductor, yet such inscription may be such as to indicate that the passenger's receiving portion is of value and not only redeemable by the conductor, but also at the company's office, the company offering for the passenger's receiving portion a book of tickets.

Of course it will be understood by the general public that the railroad company is donating a certain amount of its profits to the passengers traveling upon its lines and the manner in which the company is doing it is through the medium of the fare receipt tickets, so under such circumstances it is evident that an inducement is offered to the passenger to insist upon a receipt after the payment of fare to the conductor. As the inscription upon the passenger's receiving portion is concealed, and furthermore as the passenger will not accept the portion if it is mutilated, it is evident that there would be no likelihood of the conductor appropriating the passenger's receiving portion for the reason that he is not in a position to know which passenger's receiving portions are of value. As the conductor issues a receipt for every fare taken by him, and when so issuing a receipt retains the conductor's portion which is turned in to the auditor of the company, it is evident that every conductor's portion turned in represents a fare received and by such an arrangement a check is had upon the conductor so as to prevent him from defrauding the company of any fares received during the day or during a trip.

What I claim is—

1. A railway fare receipt ticket comprising means to constitute a passenger's receiving portion formed of two superimposed sections, the upper of said sections having marginal portions of its inner face secured to the marginal portions of the opposing face of the lower section thereby providing said upper section with an unattached portion, said lower section having that face opposing the inner face of the upper section provided with a conventional means to constitute said passenger's receiving portion of value, said conventional means concealed by the unattached portion of said upper section.

2. A railway fare receipt ticket comprising means to constitute a passenger's receiving portion formed of two superimposed sections, the upper of said sections having marginal portions of its inner face attached to marginal portions of the opposing face of the lower section thereby providing said upper section with an unattached portion, said lower section having that face which opposes the inner face of the upper section provided with a conventional means for forming said lower section into two divisions, one of said divisions provided with a conventional means to constitute it of value, said conventional means concealed by said unattached portion of the upper section.

3. A railway fare receipt ticket comprising means to constitute a stub and means to constitute a passenger's receiving portion formed integral with the stub, said passenger's receiving portion formed of two superimposed sections, the upper of said sections having marginal portions of its inner face secured to the marginal portions of the opposing face of the lower section thereby providing said outer section with an unattached portion, said lower section having that face opposing the inner face of the upper section provided with a conventional means to constitute said passenger's receiving portion of value, said conventional means concealed by the unattached portion of said upper section, said stub and passenger's receiving portion provided with a corresponding conventional means to indicate the character of fare received by the conductor for transportation.

4. A railway fare receipt ticket comprising means to constitute a stub and means to constitute a passenger's receiving portion formed integral with the stub, said passenger's receiving portion formed of two superimposed sections the upper of said sections having marginal portions of its inner face attached to marginal portions of the opposing face of the lower section thereby providing said upper section with an unattached portion, said lower section having that face which opposes the inner face of the upper section provided with a conventional means for forming said lower section into two divisions, one of said divisions provided with a conventional means to constitute it of value, said conventional means concealed by said unattached portion of the upper section, said stub and passenger's receiving portion provided with a corresponding conventional means to indicate the character of fare received by the conductor for transportation.

5. A railway fare receipt ticket comprising means to constitute a passenger's receiving portion formed of two superimposed sections having longitudinal marginal portions thereof secured together, said receiving portion having one section provided with means concealed by the unattached part of the other of said sections for constituting said passenger's receiving portion of value.

In testimony whereof we have hereunto set our hands in presence of two subscribing witnesses.

HARRY N. BROWN.
JOHN B. N. CARDOZA.

Witnesses to signature of Harry N. Brown:
C. E. HORNEY,
T. C. CARY.

Witnesses to signature of John B. N. Cardoza:
NICHOLAS L. BOGAN,
SIGMUND J. BLOCK.